Oct. 21, 1969   J. C. FITCH   3,473,822
VEHICLE SUSPENSION SYSTEM
Original Filed Jan. 5, 1966
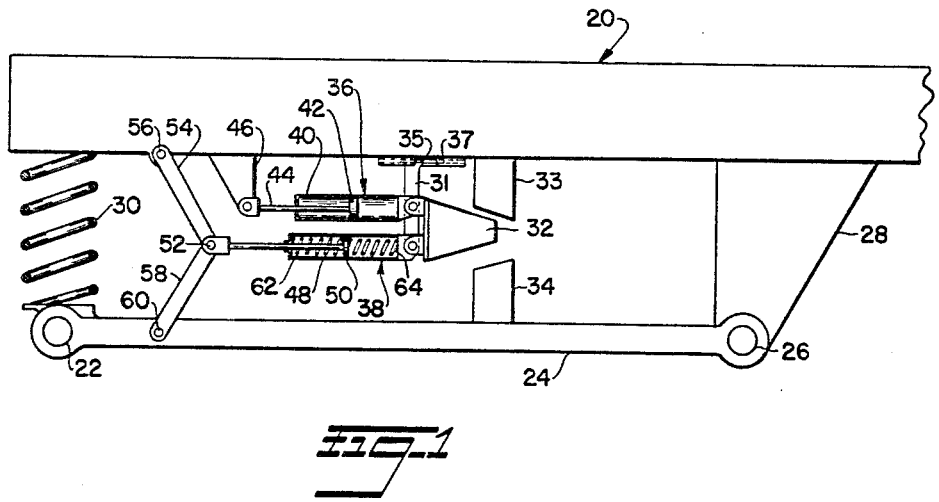
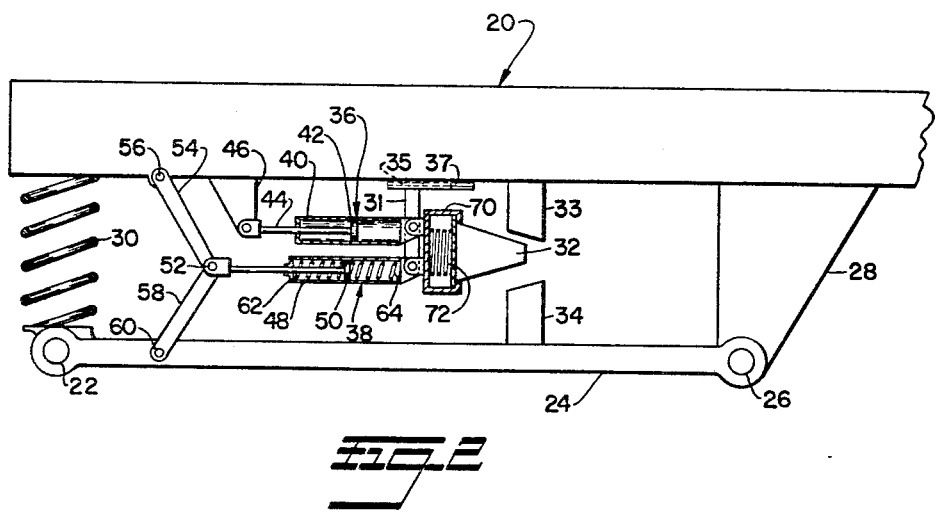
INVENTOR
JOHN C. FITCH
BY Strauch, Nolan, Neale,
Nies & Bronaugh
ATTORNEYS United States Patent Office 3,473,822
Patented Oct. 21, 1969

3,473,822
VEHICLE SUSPENSION SYSTEM
John C. Fitch, % John Fitch & Co., Inc., Limerock,
Falls Village, Conn. 06031
Continuation of application Ser. No. 518,898, Jan. 5,
1966. This application Aug. 12, 1968, Ser. No. 755,016
Int. Cl. B60g 17/00, 17/14
U.S. Cl. 280—124                    3 Claims

ABSTRACT OF THE DISCLOSURE

A vehicle suspension system in which an auxiliary spring is selectively connected to act in parallel with the main spring solely in response to changes in the load carried by the vehicle.

This application is a continuation of my application Serial No. 518,898 filed January 5, 1966 for Vehicle Suspension System and now abandoned.

This invention relates to vehicle suspension systems and more particularly to apparatus for automatically imparting a variable spring rate to vehicle suspensions.

Many vehicles, such as station wagons and trucks, are subject to extreme load variations which place unusual demands on the suspension system. When the vehicle is lightly loaded, the suspension should be effective to provide a ride which is not unduly harsh, not only for the comfort of the driver and passengers, but also to prolong the life of the vehicle. On the other hand, when the vehicle is fully loaded the suspension must be effective to avoid excessive variations in the static height of the vehicle to provide effective control of bounce and rebound and to provide effective protection against bottoming. As applied to conventional suspension systems, these requirements are mutually exclusive.

Accordingly, there have been many prior attempts to solve this problem including electromechanical or pneumatic levelizing systems and the installation of helper springs of various types. None of these prior proposals has proved to be wholly satisfactory because of high cost, unreliability, operational deficiencies, or other factors.

It is, accordingly, the principal purpose and object of the present invention to provide improved automatic variable rate suspension systems which solve the foregoing problems and related problems, which are of mechanically uncomplicated construction, which are inexpensive to manufacture, and which have an extended trouble free service life.

It is a further object of the present invention to provide improved automatic variable rate suspension systems which may be installed as original equipment or which may be installed as a modification of existing suspension systems with little or no reworking of the original system.

It is also an important object of the present invention to provide improved automatic variable rate suspension devices in which the variation in effective action is a function solely of a change in the axle position determined by load only.

In attaining these and other objects, the present invention provides an auxiliary spring which is automatically moved between operative and inoperative positions solely as a function of static vehicle load. At high load it is moved to a position in which it acts in parallel with the normal suspension system. At low loads it is moved to a completely inoperative position. In each case, the position of the spring is uneffected by transitory load variations such as those caused by passage of the vehicle wheel over an uneven road surface.

Additional objects and advantages of the present invention will become apparent as the description proceeds in connection with the accompanying drawings in which:

FIGURE 1 is a side elevation, partly diagrammatic, illustrating one form of the variable rate suspension device according to the present invention; and FIGURE 2 is a similar view illustrating a modified form of the invention.

The apparatus of the present invention may be applied successfully to a number of conventional suspension systems. It may be used with the suspension of any of the vehicle wheels, front or rear, and may be used where the wheels are independently suspended or are carried by a solid axle. For present purposes it will be described as applied to a rear vehicle suspension, which, apart from the auxiliary system of the present invention, is of wholly conventional construction.

Referring now more particularly to FIGURE 1, a portion of a conventional frame construction is indicated at 20. The axle 22 is supported by the free end of a trailing arm 24 pivotally secured at its forward end as at 26 to a depending bracket 28 rigidly connected to the frame structure 20. The normal suspension system includes a coil spring 30 compressed between the fixed frame structure 20 and the housing enclosing the axle 22.

Under normal load the spring 30 and the equivalent spring on the opposite end of the axle maintain the suspension components in the position shown. In a typical suspension of this type there may be six inches of bounce travel and four inches of rebound travel available before the system reaches its mechanical limits. An increase in the load will deflect the spring 30 and decrease the amount of bounce travel available while increasing the rebound travel available. If the load is increased sufficiently the suspension will bottom frequently when the vehicle is driven over an uneven road surface. This difficulty is overcome by the apparatus of the present invention which will now be described with continuing reference to FIGURE 1.

Essentially the unit comprises an auxiliary spring 32 preferably of wedge form which is fabricated from rubber having the desired degree of resilience. Spring 32 is adapted to be inserted between upper and lower fixed bumpers 33 and 34 carried by the frame, and the trailing arm 24, respectively. The bumpers 33 and 34 may be resilient or rigid depending upon the desired spring rate of the auxiliary spring system.

The spring block 32 is supported for movement longitudinally of the vehicle by an arm 31 depending from a plate 35 slidably received in a channel guide 37 mounted on frame 20. The longitudinal position of the spring block is determined by upper and lower link assemblies 36 and 38, respectively. The link assembly 36 comprises a dash pot of essentially conventional construction including a cylinder 40 secured to the spring block 32 and a piston 42 carried by a piston rod 44 secured to a bracket 46 depending from the frame 20. The dash pot is effective to resist and delay relative movement of the cylinder 40 and the piston 42 in either direction. The position of the spring block 32 is principally under the control of the link assembly 38 which comprises a cylinder 48 containing a piston 50 and an associated rod which is pivotally connected as at 52 to a scissors linkage comprising an upper link 54 pivoted as at 56 to the frame assembly 20 and a link 58 pivoted as at 60 to the trailing arm 24. The free ends of the links 54 and 58 are pivotally connected to each other and to the end of the piston rod at 52. The piston 50 is normally centered in the cylinder 48 by opposed relatively light springs 62 and 64.

The action of the dash pot link 36 is so correlated with the strength of the springs 62 and 64 that sudden or transitory movements of the linkage 54, 58 and the piston 50 do not affect the position of the spring block 32. However, permanent displacement of the components occasioned by a change in the static loading of the vehicle cause the spring block to assume a position which is determined entirely by the links 54, 58 and 38.

Under light load, the components will assume the position shown and the auxiliary spring 32 will be entirely out of operation. As the suspension is deflected as the vehicle travels over bumps, the fore and aft position of the spring 32 will not be affected because of the dash pot link 36. Within the normal range of movement the bumper 34 will not contact the spring 32.

When, however, the vehicle is heavily loaded the spring 30 will be deflected and the spring block 32 will be advanced to a position between the bumpers 33 and 34. The advancement of the spring 32 is a function of the deflection of the spring system 30 which is, in turn, a function of the static load on the vehicle. Once the spring 32 is positioned between the bumpers 33 and 34, it acts in parallel with the spring 30 and effectively controls, not only the static height of the vehicle, but also the spring rates of the vehicle under loaded conditions.

By proper calculation of the stiffness of the spring block, the desired spring rate can be obtained for operation under full load. Also, the automatic operation of the spring block permits the use of a main spring 30 to provide exactly the desired conditions under light or moderate load and it is no longer necessary to employ a compromise main spring which is too stiff for operation under light load conditions and too flexible under full load conditions.

The spring suspension of FIGURE 2 is the same as that of FIGURE 1 except for the manner in which the spring block 32 is connected to the ends of the link assemblies 36 and 38. In the embodiment of FIGURE 2, the spring block is mounted for limited fore and aft movement in a rectangular housing 70 carried by the link assemblies 36 and 38. A light spring 72 is compressed between the base of the housing 70 and the base of the spring block 32 which is effectively to bias the spring block 32 to the position shown in FIGURE 2.

The action of this system is essentially the same as the action of FIGURE 1. However, in the system of FIGURE 1 once the spring block 32 is engaged between the bumpers 33 and 34 it is gripped and held by these bumpers and accordingly cannot move further in a forwardly direction as the static load is increased. In the embodiment of FIGURE 2, if the static load is increased and the auxiliary spring 32 is gripped between the bumpers 33 and 34 and thereafter the static load is further increased the spring 72 will be compressed. The spring 72 will then move the spring block 32 forwardly between the bumpers 33 and 34 when the bumpers release their grip on the spring block 32 during momentary rebound action of the suspension system.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A suspension system for a vehicle having a main structure and movable running gear support comprising a main spring system operatively connected between said main structure and said support; an auxiliary spring system comprising means providing a pair of reaction surfaces mounted for movement with said main structure and said support, respectively, said surfaces being separated to form a spring receiving space therebetween, an auxiliary spring movable into and out of said space, control means operatively connected to said auxiliary spring and responsive solely to changes in the load carried by said vehicle to selectively position said auxiliary spring in said space to thereby spring connect said surfaces or withdraw said auxiliary spring from said space, and means preventing the movement of said auxiliary spring in response to transitory deflections of said main spring such as those caused by passage of the vehicle over an uneven road surface.

2. The suspension system according to claim 1, wherein said last mentioned means comprises a dash-pot.

3. A suspension system for a vehicle having a main structure and a movable running gear support comprising a main spring system operatively connected between said main structure and said support, an auxiliary spring assembly adapted for selective connecton between said main structure and said support, to act in parallel with said main spring system, means for sensing a predetermined deflection of said main spring system, said sensing means also acting directly on said auxiliary spring assembly to connect said auxiliary spring assembly between said main structure and said support, and means interposed between said sensing means and said auxiliary spring assembly for preventing the connection of said auxiliary spring assembly in response to transitory deflections of said main spring system such as those caused by passage of the vehicle over an uneven road surface.

References Cited

UNITED STATES PATENTS 2,873,124  2/1959  Walker _____ 280—124
3,086,792  4/1963  Schultz _____ 267—33 X PHILIP GOODMAN, Primary Examiner U.S. Cl. X.R.
267—20